United States Patent [19]

Sano et al.

[11] Patent Number: 4,943,883

[45] Date of Patent: Jul. 24, 1990

[54] QUARTERNARY AMORPHOUS MAGNETIC ALLOY THIN FILM AND MAGNETIC HEAD INCLUDING SAME

[75] Inventors: Masaaki Sano; Takao Imagawa; Kouichi Nishioka, all of Hitachi; Shinji Narishige; Masanobu Hanazono, both of Mito; Takashi Onishi, Hiratsuka; Toshihiro Yoshida, Odawara, all of Japan

[73] Assignee: Hitachi, Ltd., Tokyo, Japan

[21] Appl. No.: 266,080

[22] Filed: Nov. 2, 1988

[30] Foreign Application Priority Data

Nov. 9, 1987 [JP] Japan ................................ 62-282850

[51] Int. Cl.$^5$ .............................................. G11B 5/147
[52] U.S. Cl. ...................................... 360/126; 148/311
[58] Field of Search ............... 360/126, 125, 127, 120; 148/311, 425, 304; 420/435

[56] References Cited

U.S. PATENT DOCUMENTS 4,608,297 8/1986 Shimada et al. .................... 360/126

FOREIGN PATENT DOCUMENTS 0266658 12/1986 European Pat. Off. ............ 360/126
0021504 2/1985 Japan .
0022722 2/1985 Japan .

Primary Examiner—David J. Severin
Attorney, Agent, or Firm—Antonelli, Terry, Stout & Kraus

[57] ABSTRACT

A thin film magnetic head provided with a first and a second thin film made of a magnetic material, disposed so as to form a closed magnetic circuit; and an intermediate film made of a non-magnetic material, disposed between the first and the second thin films so as to form a magnetic gap at a part of the magnetic circuit; wherein at least one of the first and the second thin films is made of a quaternary amorphous magnetic alloy, whose principal component is cobalt and which contains hafnium, tantalum and palladium.

12 Claims, 4 Drawing Sheets $\lambda$ = MAGNETOSTRICTION CONSTANT
$B_s$ = SATURATED MAGNETIC FLUX DENSITY (TESLA)

CURVE I : MATERIAL ACCORDING TO THIS INVENTION, AMORPHOUS ALLOY THIN FILM OF QUATERNARY SYSTEM Co-Hf-Ta-Pd (87at% Co, 6at%Hf, 2at%Ta, 5at%Pd)

CURVE II : EXAMPLE FOR COMPARISON AMORPHOUS ALLOY THIN FILM OF TERTIARY SYSTEM Co-Hf-Ta (90at%Co, 4at%Hf, 6at%Ta)

CURVE III : EXAMPLE FOR COMPARISON PERMALLOY (83at%Ni, 17at% Fe)

QUARTERNARY AMORPHOUS MAGNETIC ALLOY THIN FILM AND MAGNETIC HEAD INCLUDING SAME

BACKGROUND OF THE INVENTION

This invention relates to a thin film magnetic head and in particular to a magnetic head using amorphous magnetic alloy thin films suitable for a high density recording.

A thin film magnetic head is constructed, in general, by superposing successively a lower magnetic film, a gap non-magnetic film, an interlayer insulating film, a conductor coil, an interlayer insulating film, an upper magnetic film and finally a non-magnetic protecting film on a non-magnetic substrate made of ceramic by applying thin film techniques. Recording in and reproduction from the recording medium are effected usually by means of a single thin film magnetic head.

The working principle of this thin film magnetic head consists in that when information is written in the recording medium, a signal current is made flow through the conductor coil, which generates a high magnetic field at the magnetic gap of the magnetic films exposed at the extremity of the thin film magnetic head and magnetizes selectively the recording medium moving in the neighborhood of the exposed part at the extremity. On the contrary, when the information stored in the recording medium is read out, the selectively magnetized recording medium is moved in the neighborhood of the magnetic gap, which produces variations in magnetic flux in the magnetic core composed of the two magnetic films, which generates a voltage across the conductor coil.

The recording density is made higher with increasing speed of writing and reading information in and from such recording medium. For this purpose it is required that the magnetic films have magnetic characteristics such as a low coercive force, a magnetic field of low anisotropy and, at the same time, a high saturated magnetic flux density, and to be made of a material having a low magnetostriction constant.

The magnetic hysteresis loop becomes narrower with decreasing coercive force and the magnetization is more rapid and easy with a magnetic field of decreasing anisotropy. Further the magnetic field produced by the magnetic head and contributing to the recording is stronger and more abrupt with increasing saturated magnetic flux density, by which information is recorded with a high resolution. In addition, variations in the magnetic characteristics such as the permeability, the coercive force, etc. are smaller with decreasing magnetostriction constant, corresponding to remaining stress due to the difference in the thermal expansion coefficient between the magnetic films and the substrate at the formation thereof or to external stress due to mechanical working, which stabilizes record reading-out and writing-in characteristics.

Heretofore, primarily a permalloy (80Ni-Fe) film deposited by plating, evaporation or sputtering, whose saturated magnetic flux density is about 1.0 Tesla (T), is used as magnetic core material for the thin film magnetic head. However, with this permalloy film, whose saturated magnetic flux density is about 1.0 T, there is a limit to increasing the recording density. Therefore, it is not possible to satisfactorily deal with requirements to increase the capacity and the recording density for a large scale electronic computer by using conventional magnetic core materials. Thus, it is desired to find a material having a saturated magnetic flux density higher than 1.3 T.

Furthermore, it is thought that the magnetic characteristics required for the core material for the thin film magnetic head are an excellent uniaxial anisotropy, an anisotropy field as low as 3 to 5 Oersted (Oe) to increase the permeability and a coercive force in the direction of the axis of hard magnetization smaller than 1 Oe. What is more important is that the magnetostriction constant is brought as closely as possible to zero in order that the magnetic head is hardly influenced by external stress. It is thought that the magnetostriction constant should preferably be between $+0.5 \times 10^{-6}$ and $-2.0 \times 10^{-6}$, taking into account the shape of the magnetic core or the relation to the stress in an $Al_2O_3$ film deposited on the magnetic core by sputtering.

In order to fulfill these requirements, various sorts of developments using amorphous alloy films are carried out, because the amorphous alloy film has no magnetocrystalline anisotropy. Among them, amorphous alloy thin films of metal-metal system such as Co-Zr system or Co-Hf system, whose saturated magnetic flux density can be higher than 1.3 T, have been found. However, since they have a magnetostriction constant which is positive and as great as $2 \times 10^{-6}$, there have been proposed tertiary amorphous films including Nb, Ta, W, etc., which are known as elements reducing magnetostriction constant, in addition to the binary systems described above. As representatives thereof, there are known magnetic heads using amorphous films of Co-Zr-Ta or those using amorphous films of Co-Hf-Ta, as disclosed in Japanese patent unexamined publications JP-A-60-21504 and JP-A-60-22722.

However, since these tertiary amorphous alloys of Co-Zr-Ta and Co-Hf-Ta systems contain a large amount of Zr, Ta, etc., which are easily oxidized, they have a weakness in the corrosion resistance thereof because of the fact that Zr, Ta, etc. are oxidized due to the humidity in the atmosphere. Therefore, the films loose their magnetic characteristics, which gives rise to a problem that they lack high reliability as a material used in a thin film magnetic head.

Furthermore, since the Co-Hf-Ta tertiary system has a very narrow composition area in which the saturated magnetic flux density is high and the magnetostriction constant is reduced to the proximity of zero, it has a problem that it is difficult to stably form magnetic films for a thin film magnetic head.

SUMMARY OF THE INVENTION

The object of this invention is to provide a thin film magnetic head which can solve the problems described above by using magnetic films having an excellent corrosion resistance, a high saturated magnetic flux density and a wide composition area in which the magnetostriction constant is reduced, so that they can be easily formed.

The thin film magnetic head according to this invention includes a pair of magnetic films superposed one after another on a non-magnetic substrate, the magnetic films being made of a quaternary amorphous alloy whose principal component is cobalt, to which hafnium, tantalum and palladium are added.

In these amorphous magnetic films, the quantities of Hf and Ta are important and the effect of Pd is made efficient by determining appropriately the quantities of these two elements.

That is, in a tertiary system of Co-Hf-Ta, it has been found on the basis of experimental results that the effect of Pd per atomic % lowers the saturated magnetic flux density by 0.025 T and the magnetostriction constant by $0.6 \times 10^{-6}$. Consequently it is important to determine the quantities of Hf and Ta, based on these experimental results.

Concerning Hf, when the content is lower than 3.5 atomic %, the magnetic films are crystallized and do not present excellent soft magnetic characteristics. On the contrary, when the content is higher than 7 atomic %, amorphous films are formed stably, but since the saturated magnetic flux density is lowered remarkably, it is not desirable. Concerning Ta, since a large quantity thereof lowers the corrosion resistance, it is desirable that the quantity is as small as possible. When the content of Ta is lower than 1 atomic % in the presence of Hf, it is feared that crystallization takes place and the initial value of the magnetostriction is positive and too great. On the contrary, it is not desirable that the content of Ta exceeds 4 at %, because the corrosion resistance is worsened and the saturated magnetic flux density is remarkably reduced. Therefore the composition is so determined that Hf is 3.5-7 atomic %; Ta is 1-4 atomic %; and the remaining part is Co; the saturated magnetic flux density is kept to a value as high as 1.35-1.45 T; and the magnetostriction constant is suppressed at greatest at $+3 \times 10^{-6}$. Pd is added thereto, depending on the quantities of Hf and Ta. The quantity of addition is regulated in a region from 0.2 to 6 atomic % so that the saturated magnetic flux density is higher than 1.2 T, and more preferably 1.3 T and that the magnetostriction constant is in the proximity of zero or in the negative state.

DESCRIPTION OF THE PREFERRED EMBODIMENTS

The magnetic film of the thin film magnetic head according to this invention is made of a non-magnetic alloy having a quaternary composition, whose principal component is Co, to which small amounts of Hf, Ta and Pd are added. This magnetic film has a high saturated magnetic flux density and a magnetostriction constant in the neighborhood of zero. Further the material is excellent in corrosion resistance.

Figure 2:
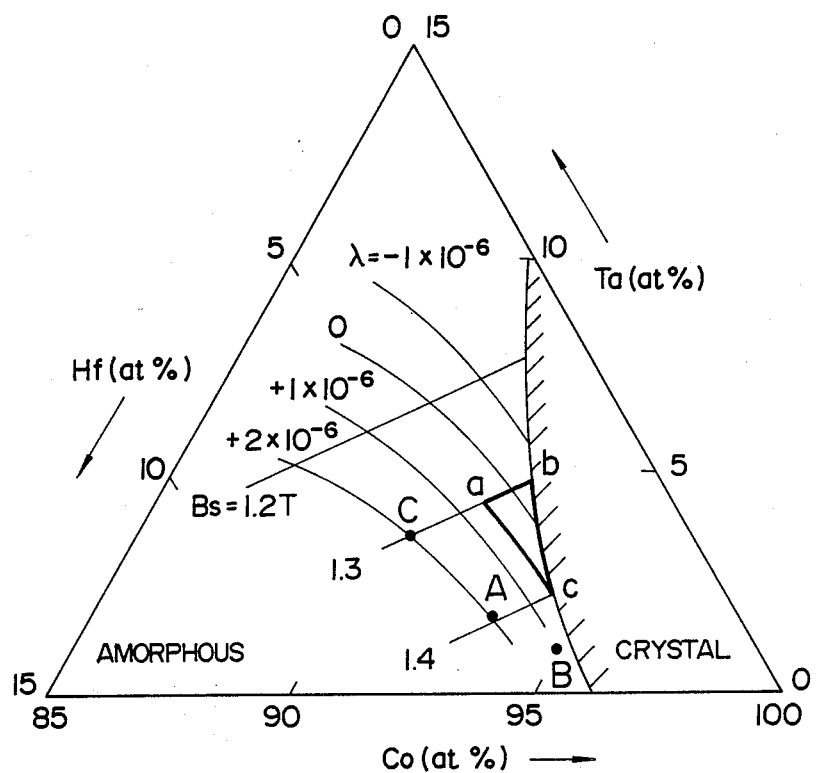
FIG. 2 is a diagram showing experimental results on magnetic characteristics of the tertiary amorphous alloy of Co-Hf-Ta, which is the starting point of this invention.

As an example of comparison with this invention, the relation between the saturated magnetic flux density $B_s$ as well as the magnetostriction constant $\lambda$ and the composition of a tertiary amorphous alloy film of Co-Hf-Ta, which represents a prior art technique, is indicated in FIG. 2. The composition area which is suitable as the magnetic film for the thin film magnetic head and in which the saturated magnetic flux density is higher than 1.3 Tesla and the magnetostriction constant varies from $+0.5 \times 10^{-6}$ to $-2.0 \times 10^{-6}$, i.e. from a positive value in the proximity of zero to a negative value, is a domain enclosed by a thick line connecting a, b and c in FIG. 2. Since this domain is extremely narrow, it is difficult to stably fabricate the magnetic film.

Figure 3A:
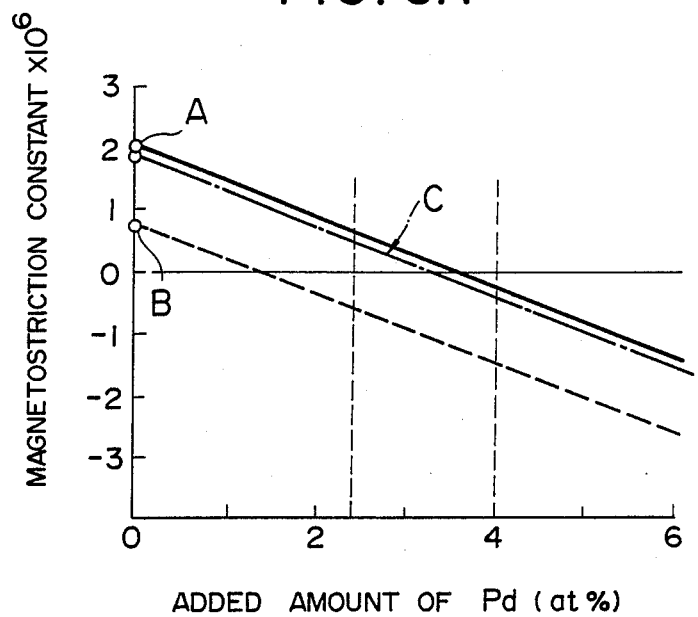
FIG. 3A is a diagram representing influences of the quantity of Pd added to the compositions indicated by A, B and C in FIG. 2 on the magnetostriction constant.
Figure 3B:
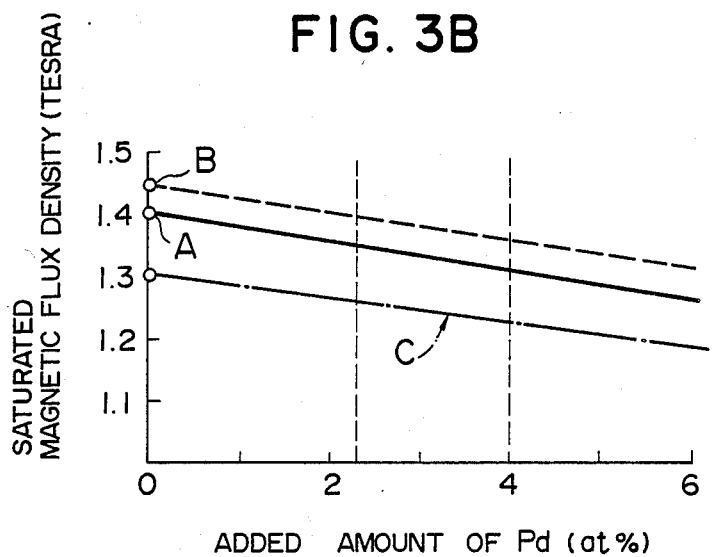
FIG. 3B is a diagram representing influences of the quantity of Pd added to the compositions indicated by A, B and C in FIG. 2 on the saturated magnetic flux density.

Therefore, according to this invention, the added quantity of Ta, which has the characteristics of reducing the magnetostriction constant, lowering the saturated magnetic flux density and being easily oxidized due to the humidity in the atmosphere, is reduced. The quantity of Hf is increased, corresponding to the reduced amount of Ta, Hf the characteristics that it produces a relatively small decrease in the saturated magnetic flux density, that although it gives rise to a positive great magnetorestriction constant, it makes the formation of a stable amorphous substance easier, that it makes the alloy have a good corrosion resistance, etc. Therefore, a composition is obtained which stabilizes the formation of amorphous substance and gives a magnetostriction constant of $1-2 \times 10^{-6}$, i.e. a positive great value, while keeping the saturated magnetic flux density at a relatively great value. Then Pd having characteristics of reducing the magnetostriction constant and making the alloy be hardly oxidized is added to the composition, so that the magnetostriction constant has a negative value, while keeping the decrease in the saturated magnetic flux density small. FIGS. 3A and 3B show variations in the saturated magnetic flux density and the magnetostriction constant, respectively, in the case where Pd is added, e.g., to the composition indicated by A in FIG. 2, i.e. to a film having a composition of 93 atomic % Co, 2 atomic % Ta and 5 atomic % Hf (saturated magnetic flux density : 1.4 Tesla, magnetostriction constant : $2 \times 10^{-6}$). By adding Pd atomic 2.2-4 at % it is possible to set the saturated magnetic flux density above 1.3 Tesla and the magnetostriction constant at a value between $+0.5 \times 10^{-6}$ and $-0.5 \times 10^{-6}$, i.e. a value close to zero. Together therewith, variations in the saturated magnetic flux density and the magnetostriction constant are indicated in FIGS. 3A and 3B, respectively, in the case where Pd is added to the composition indicated by B in FIG. 2, i.e. to a film having a composition of 95 atomic %, 1 atomic % Ta and 4 atomic % Hf (saturated magnetic flux density : 1.45 Tesla, magnetostriction constant $+0.8 \times 10^{-6}$). For a region of the added amount of Pd from 0.2 atomic % to 4.5 atomic % it can be seen that the magnetostriction constant has suitable values in a wide region from $+0.5 \times 10^{-6}$ to $-2 \times 10^{-6}$ and further the saturated magnetic flux density has a value above 1.3 Tesla.

In addition, the composition, for which the contents of Hf and Ta are increased, as far as the saturated magnetic flux density is not reduced significantly, and stable amorphous films can be obtained, has been studied. Variations in the saturated magnetic flux density and the magnetostriction constant are indicated also in FIGS. 3A 3B, respectively, in the case where Pd is added to the composition indicated by C in FIG. 2, i.e. to a film having a composition of 90.5 atomic % Co, 3.5 atomic % Ta and 6.0 atomic % Hf (saturated magnetic flux density : 1.3 Tesla, magnetostriction constant $+2\times 10^{-6}$). For a region of the added amount of Pd from 2 atomic % to 5 atomic % it can be seen that the magnetostriction constant has suitable values in a wide region from $+1.0\times 10^{-6}$ to $-1.0\times 10^{-6}$ and further the saturated magnetic flux density has a value above 1.2 Tesla.

However, although the variations in the magnetostriction with respect to the added amount of Pd present a tendency completely identical to that for the composition indicated by A in FIG. 2, since both the contents of Ta and Hf at the starting point, i.e. for the composition (indicated by C in FIG. 2) for which the content of Pd is zero, are greater than those for the composition indicated by A, it is feared that the saturated magnetic flux density is lower than that for the composition indicated by A.

Consequently, in order to keep the saturated magnetic flux density at a high value, it is desirable that the contents of Ta, Hf, Pd, etc. are as small as possible. That is, the desirable contents are Ta : 1–3 atomic %, Hf : 3.5–5.5 atomic %, and Pd : 0.2–3.0 atomic %. From the above description it was understood that the desired magnetic characteristics can be obtained in a wide composition area by using the quaternary system of Co-Hf-Ta-Pd, while they can be obtained only in a narrow composition area by using the tertiary system of Co-Hf-Ta.

Figure 4:
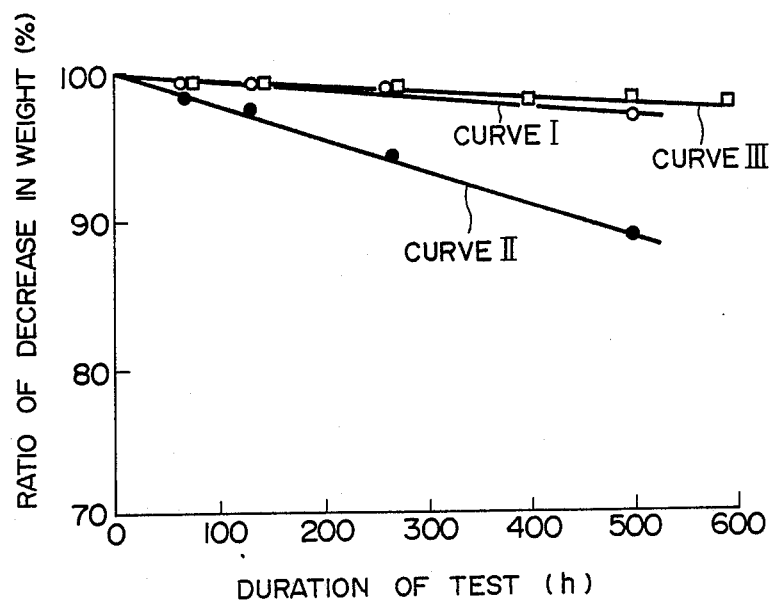
FIG. 4 is a diagram representing results of corrosion tests for a quaternary amorphous alloy of Co-Hf-Ta-Pa according to this invention.

In addition, by reducing Ta, which is easily oxidized and adding Pd correspondingly, which is hardly oxidized, the corrosion resistance is remarkably improved, as indicated by curve I in FIG. 4, with respect to that of the tertiary system of Co-Hf-Ta (curve II), the former being at the same level as permalloy (curve III).

From the result described above, it was verified that a magnetic film having a high corrosion resistance, a high saturated magnetic flux density and a wide composition area, for which the magnetostriction constant is in the neighborhood of zero, can be obtained by using the quaternary amorphous alloy of Co-Hf-Ta-Pd, whose principal component is Co and which contains Hf at 3.5–7 atomic %, preferably atomic 3.5–5.5 atomic %, Ta atomic 1–4 atomic %, preferably at 1–3 atomic %, and Pd 0.2–6 atomic %, preferably atomic 0.2–3 atomic %.

Hereinbelow this invention will be explained more in detail, using several examples.

EXAMPLE I

Figure 1A:
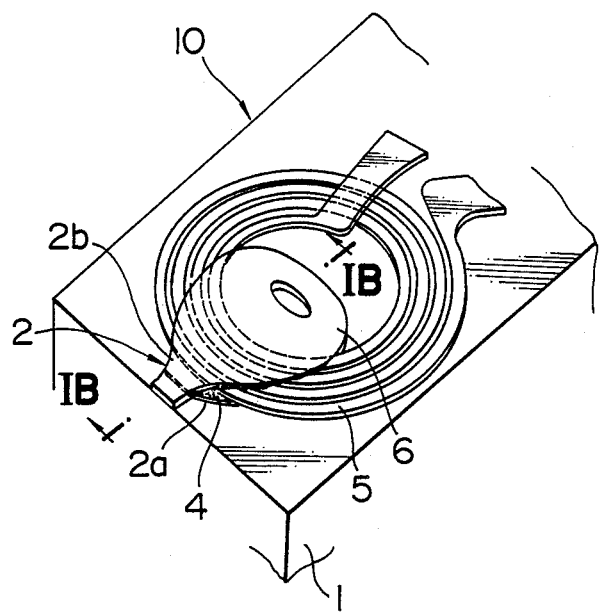
FIG. 1A is a perspective view of a thin film magnetic head fabricated by forming a quaternary amorphous alloy of Co-Hf-Ta-Pd.
Figure 1B:
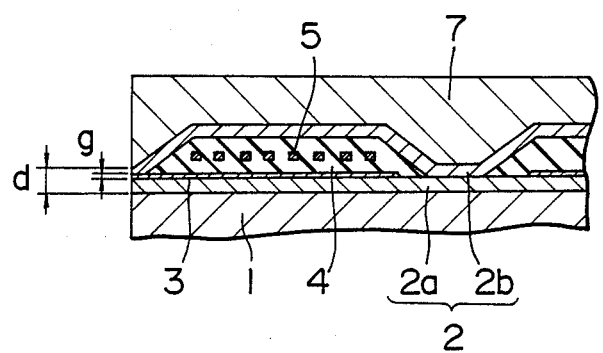
FIG. 1B is a cross-sectional view of the thin film magnetic head along the line 1B—1B, viewed in the direction indicated by arrows in FIG. 1A.

Referring to FIGS. 1A and 1B, a film made of the quaternary amorphous alloy of Co-Hf-Ta-Pd 1 to 2 μm thick was deposited by the RF sputtering method on a ceramic substrate 4 to 5 mm thick, whose surface was satisfactorily polished and rinsed, as the lower magnetic film. The composition of the magnetic film 2 was formed by using a target having the composition indicated by A in FIG. 2 (93 atomic % Co, 2 atomic % Ta, 5 atomic % Hf), on which 20 chips of Pd 1 mm thick of 4 mm square were located, and by sputtering them. The RF output was 300 W, argon gas was used as the sputtering gas and the substrate 1 was water-cooled. The composition of a film obtained by sputtering on a dummy substrate separately disposed was 91.2 atomic % Co, 1.7 atomic % Ta, 5.1 atomic % Hf and 2.0 atomic % Pd, which had a saturated magnetic flux density of 1.3 Tesla and a magnetostriction constant of $-0.5\times 10^{-6}$.

The anisotropic magnetic field of the thin film just after sputtering is great and the permeability is therefore small.

It is known that thermal treatment is efficient for reducing this anisotropic magnetic field.

Therefore, the substrate, on which the lower magnetic film 2a was deposited by sputtering, was subjected to thermal treatment in a rotating magnetic field at 350° C. for 1 hour. Thereafter the lower magnetic film 2a was patterned into a predetermined shape for the magnetic core 6 by the ion milling method.

Then a gap non-magnetic film 3 made of alumina, etc., 0.2–1 μm thick, an insulating layer 4 10 μm thick, and a conductor coil 5 were deposited one after another thereon, which were worked into predetermined shapes by the ion milling method or the wet etching method. Further, thereon the upper magnetic film 2b was formed by sputtering and subjected to thermal treatment in the rotating magnetic field at 300° C. for 1 hour just as the lower magnetic film 2a. Then it was patterned into the predetermined shape for the magnetic core 6 by the ion milling method. Thereafter an insulating film made of alumina, serving as a protecting film 7, was deposited over the whole surface of the substrate by the sputtering method. Finally each element was separated by cutting and the extremity side of the magnetic head was ground into a predetermined size to constitute the magnetic gap g and to obtain each separated thin film magnetic head 10.

Fig. 1A is a perspective view of the thin film magnetic head thus cut out and Fig. 1B is a cross-sectional view of the magnetic core portion in the thin film magnetic head. Electric characteristics of the thin film magnetic head thus fabricated were compared with respective electric characteristics of a thin film magnetic head using conventional permalloy. As the result, it was found that the overwrite property, i.e., a property indicating how much recording on the recording medium is erased by a high frequency magnetic field of 20 kHz, is improved by about 4 to 5 dB and the recording magnetic field intensity is increased by about 30%. Thus the thin film magnetic field is satisfactorily applicable to a high coercive force medium for high density recording.

EXAMPLE II

Just as in EXAMPLE I, a film made of the quaternary amorphous alloy of Co-Hf-Ta-Pd 1 μm thick was deposited by the RF sputtering method on a ceramic substrate 1, as indicated in Figs. 1A and 1B. At this time the composition of the magnetic film 2 was formed by using a target having the composition indicated by B in FIG. 2 (95 atomic % Co, 1.0 atomic % Ta, 4.0 atomic % Hf), on which 8 palladium chips 1 mm thick of 4 mm square were located, and by sputtering them. The sputtering condition was the same as that used for EXAMPLE I. The composition of a film obtained by sputtering on a dummy substrate separately disposed was 94 atomic % Co, 1.0 atomic % Ta, 4.0 atomic % Hf and 1.0 at % Pd, which had a saturated magnetic flux density of 1.40 Tesla and a magnetostriction constant of $-0.1\times 10^{-6}$. After the sputtering each thin film magnetic head was fabricated by the process identical to that described for EXAMPLE I and its electric characteristics were measured. As the result it was verified that its overwrite property is somewhat better than that found in EXAMPLE I.

EXAMPLE III

Just as in EXAMPLE I, a film made of the quaternary amorphous alloy of Co-Hf-Ta-Pd 1 μm thick was deposited by the RF sputtering method on a ceramic substrate 1, as indicated in Figs. 1A and 1B. At this time, the composition of the magnetic film 2 was formed by using a target having the composition indicated by C in FIG. 2 (90.5 atomic % Co, 3.5 atomic % Ta, 6.0 atomic % Hf), on which 35 palladium chips 1 mm thick of 4 mm square were located, and by sputtering them. The sputtering condition was the same as that used for EXAMPLE I. The composition of a film obtained by sputtering on a dummy substrate separately disposed was 87.3 atomic % Co, 3.4 atomic % Ta, 5.8 atomic % Hf and 3.5 atomic % Pd. All the contents of Ta, Hf and Pd were greater than those obtained in EXAMPLEs I and II. Accordingly the saturated magnetic flux density was somewhat lower than those obtained in EXAMPLEs I and II and it was 1.24 Tesla. The magnetostriction constant was as small as those obtained in EXAMPLEs I and II and it was $-0.1 \times 10^{-6}$. After sputtering, each thin film magnetic head was fabricated by a process identical to that described for EXAMPLE I and its electric characteristics were measured. As a result, it was verified that its overwrite property is somewhat lower or equal with respect to that found in EXAMPLE I.

However, when the contents of Ta, Hf and Pd are increased, although the quaternary system forms more stably an amorphous film, there is a tendency that the saturated magnetic flux density is reduced. Consequently it is desirable that the contents of Ta, Hf and Pd are as low as possible, in order to utilize efficiently the effect of the high saturated magnetic flux density. However, if they are too low, it is feared that the film is crystallized by the thermal treatment in the succeeding steps or heat cycles in the process. Consequently, compositions for which the contents of Ta, Hf and Pd are regulated preferably to Ta : 1-3 atomic %, Hf : 3.5-5.5 atomic % and Pd : 0.2-3.0 atomic %, present excellent soft magnetic characteristics and at the same time a high saturated magnetic flux density.

As explained above, according to this invention, it becomes easier to stably form the magnetic film, because the composition area in which the magnetic film has a high corrosion resistance and at the same time a high saturated magnetic flux density and a small magnetostriction constant, is enlarged by applying a quaternary amorphous alloy of Co-Hf-Ta-Pd, whose principal component is Co, to the magnetic film for a thin film magnetic head.

Further, since the corrosion resistance of the magnetic film for the thin film magnetic head is excellent the reliability of the thin film magnetic head is improved. In addition, since the saturated magnetic flux density is high and the magnetostriction constant is small, write-in and read-out characteristics are improved, and it can satisfactorily deal with increase in the recording density.

We claim:

1. A thin film magnetic head comprising:
   a first and a second thin film made of a magnetic material, disposed so as to form a closed magnetic circuit; and
   an intermediate film made of a non-magnetic material, disposed between said first and said second thin films so as to form a magnetic gap at a part of said magnetic circuit;
   wherein at least one of said first and said second thin films is made of a quaternary amorphous magnetic alloy, whose principal component is cobalt and which contains hafnium, tantalum and palladium.

2. A thin film magnetic head according to claim 1, wherein said amorphous magnetic alloy has a saturated magnetic flux density above 1.2 T and a magnetostriction constant between $1.0 \times 10^{-6}$ and $-2.0 \times 10^{-6}$.

3. A thin film magnetic head according to claim 1, wherein said amorphous magnetic alloy contains hafnium 3.5-7 atomic %, tantalum 1-4 atomic % and palladium 0.2-6 atomic %.

4. A thin film magnetic head according to claim 3, wherein said amorphous magnetic alloy contains hafnium 3.5-5.5 atomic %, tantalum 1-3 atomic % and palladium 0.2-3 atomic %.

5. A thin film magnetic head comprising:
   a substrate made of a non-magnetic material;
   a first and a second thin film made of a magnetic material superposed on said substrate, disposed so as to form a closed magnetic circuit having a magnetic gap at a part thereof;
   an intermediate film made of a non-magnetic material, interposed in said magnetic gap; and
   a conductor coil wound around said magnetic circuit;
   wherein at least one of said first and said second thin films is made of a quaternary amorphous magnetic alloy, whose principal component is cobalt and which contains hafnium, tantalum and palladium.

6. A thin film magnetic head according to claim 5, wherein said amorphous magnetic alloy has a saturated magnetic flux density above 1.2 T and a magnetostriction constant between $1.0 \times 10^{-6}$ and $-2.0 \times 10^{-6}$.

7. A thin film magnetic head according to claim 5, wherein said amorphous magnetic alloy contains hafnium 3.5-7 atomic %, tantalum 1-4 atomic % and palladium 0.2-6 atomic %.

8. A thin film magnetic head according to claim 7, wherein said amorphous magnetic alloy contains hafnium 3.5-5.5 atomic %, tantalum 1-3 atomic % and palladium 0.2-3 atomic %.

9. A thin film made of an amorphous magnetic alloy of quaternary system for magnetic heads, whose principal component is cobalt and which contains hafnium, tantalum and palladium.

10. A thin film made of an amorphous magnetic alloy according to claim 9, containing hafnium 3.5-7 atomic %, tantalum 1-4 atomic % and palladium 0.2-6 atomic %.

11. A thin film made of an amorphous magnetic alloy according to claim 10, containing hafnium 3.5-5.5 atomic %, tantalum 1-3 atomic % and palladium 0.2-3 atomic %.

12. A thin film made of an amorphous magnetic alloy according to claim 10, having a saturated magnetic flux density above 1.2 T and a magnetostriction constant between $1.0 \times 10^{-6}$ and $-2.0 \times 10^{-6}$.

* * * * *